C. J. PERKINS.
MOLD FOR PLASTIC BLOCKS.
APPLICATION FILED FEB. 26, 1918.
1,285,355.
Patented Nov. 19, 1918.
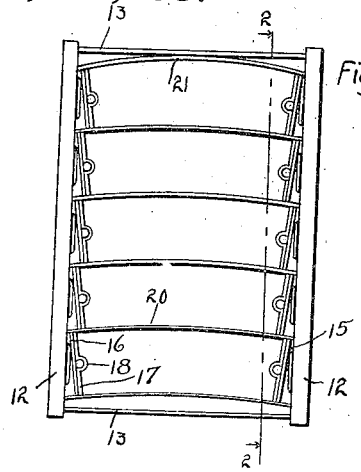
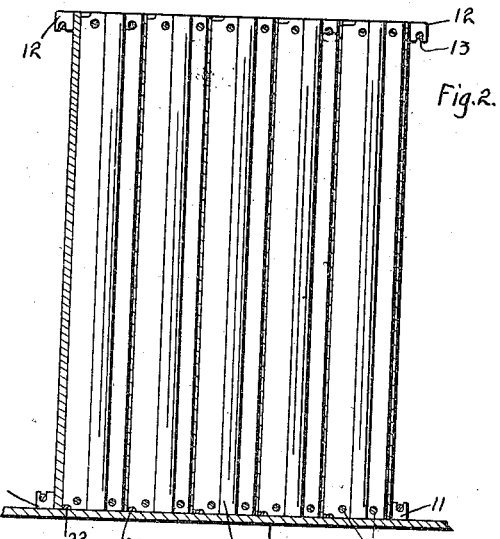
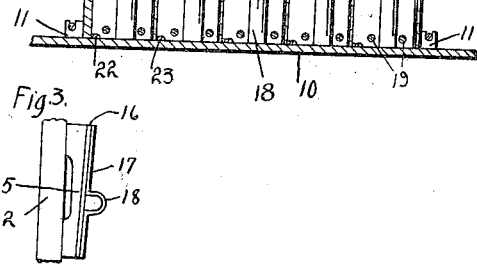
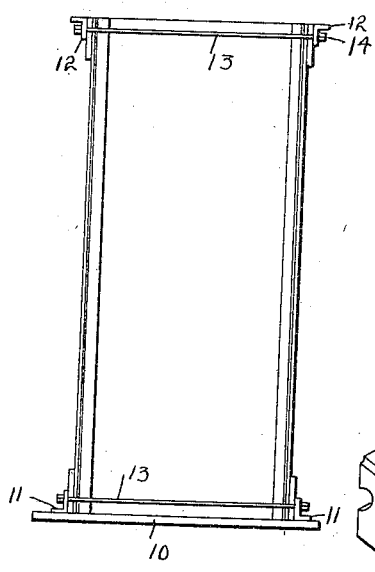
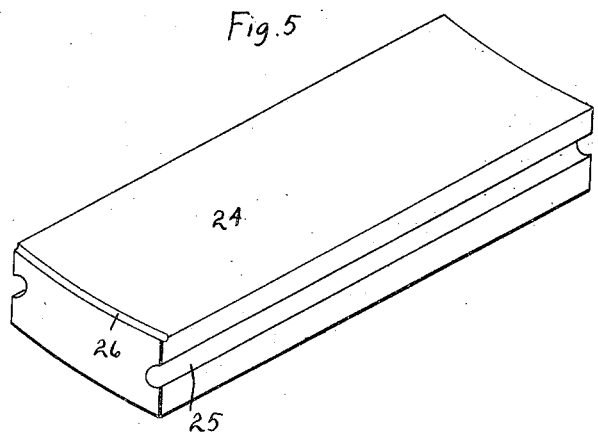
Witness
E. H. Buchanan
Inventor
Charles J. Perkins
By Orwig & Bair ATTYS.

UNITED STATES PATENT OFFICE.

CHARLES J. PERKINS, OF DES MOINES, IOWA, ASSIGNOR TO PERFECTION CONCRETE STAVE SILO COMPANY, OF DES MOINES, IOWA.

MOLD FOR PLASTIC BLOCKS.

1,285,355.  Specification of Letters Patent.  Patented Nov. 19, 1918.

Application filed February 26, 1918. Serial No. 219,179.

*To all whom it may concern:*

Be it known that I, CHARLES J. PERKINS, a citizen of the United States, and resident of Des Moines, in the county of Polk and State of Iowa, have invented a certain new and useful Mold for Plastic Blocks, of which the following is a specification.

The object of my invention is to provide a mold of simple, durable and inexpensive construction for making plastic blocks.

More particularly it is my object to provide such a mold peculiarly adapted for making plastic blocks curved on the arc of a predetermined circle and adapted for use in making silos or other circular structures.

Still a further object is to provide such a mold especially adapted for making blocks curved as above mentioned, and forming the upright edges of the blocks beveled for the better arrangement of the blocks in circular structures.

Still a further object is to provide in such a mold readily interchangeable means for varying the bevel of the upright edges of said blocks for assembling the said blocks for making circular structures of different diameters.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a mold embodying my invention.

Fig. 2 shows a vertical, sectional view through the same taken on the line 2—2 of Fig. 1.

Fig. 3 is an enlarged, detail, plan view of part of one of the mold sections.

Fig. 4 shows an end elevation of the same mold, and

Fig. 5 shows a perspective view of one of the plastic blocks made with the mold.

My mold is designed for making blocks to stand on end in vertical position.

In the accompanying drawings, I have used the reference numeral 10 to indicate the base of the mold which may be a plank or the like of any suitable construction.

As a matter of fact my mold may be used upon a flat concrete floor or any suitable flat surface.

My mold proper consists of lower horizontal angle irons 11 forming lower frame members spaced from each other, and upper horizontal angle irons 12 forming upper frame members similarly spaced from each other and extending above and spaced from the angle irons 11.

The respective angle irons 11 on each side of the mold are secured together by rods 13 extended through suitable notches in the flanges of the angle irons 11, and the respective angle irons 12 on each side of the mold are secured together by similar rods 13 arranged in similar notches. It will be understood that the ends of the rods 13 are screw-threaded to receive nuts 14.

The side walls of my improved mold are each made of a series of mold members.

Secured to each of the angle irons above mentioned is a series of blocks or castings 15, the inner surfaces of which are beveled, as clearly illustrated in Fig. 3.

It will be understood that the blocks 15 are arranged in upper and lower pairs and also in opposite horizontal pairs.

Secured to each vertically spaced pair of blocks 15 is a flat sheet 16, and secured to each sheet 16 is a similar flat sheet 17 forming a side mold member having a central, inwardly extending rib 18. The sheets 17 are of the same width as the blocks 15 and extend from the top to the bottom of the inside of the mold.

The sheets 16 and 17, the blocks and the angle irons are connected by bolts 19 or the like.

The sheets 17 are made of thin sheet metal and the sheets 16 are secured thereto simply for reinforcing purposes, and may be dispensed with if the sheets 17 are of heavy enough material.

The blocks 15 and plates 17 on each side of the mold are spaced from each other slightly horizontally for leaving slots to receive the transverse mold members 20 which are made of sheet iron or the like, and are preferably curved from side to side, as illustrated in Fig. 1, on the arc of a circle which is to be built from the completed blocks.

At one end of the mold I use a horizontal end mold member 21 which may be made of wood or the like as desired. One of the members 20 forms the end mold member at the opposite end of the mold.

Such a horizontal mold member may be used at either or both ends of the mold.

The mold members 20 can be slipped into position or readily removed therefrom whenever desired by simply sliding them upwardly out of the mold.

Some little play is allowed between the ends of the members 20 and the blocks 15 in order to permit the members 20 of different curvatures to be used.

It will be obvious that by using blocks 15 of different bevels completed plastic blocks having edges of different bevels may be made.

Each of the strips 16 and 17 is preferably formed with a notch 22 at each corner of one side edge to receive a quarter round or the like 23 to make a groove at one or both ends of the completed block. The mold is assembled in the form hereinbefore described, and each compartment is partly filled with concrete or the like which may be tamped; thereafter each compartment may be further filled and the concrete again tamped until the blocks in the various compartments are completed. The quarter round 23 may be used or dispensed with as desired.

The completed block indicated by the reference character 24, shown in Fig. 5, has its inner and outer surface curved, as illustrated, and has on each side edge a longitudinal groove 25, and may be formed with a groove 26 adjacent to one or more horizontal edges if desired.

The advantages of my improved mold may be largely seen from the foregoing description.

It will be seen that the mold has a comparatively small number of parts and may be used on any plank or flat surface. The mold may be very easily taken apart and collapsed for shipment in small space by withdrawing the members 20 and 21 and taking out the rods 13.

By changing each block 15 for blocks having different diameters, and by changing the members 20 for others of different curvature, completed blocks having any desired curvature, and having their edges formed with any desired bevel may be made.

Some changes may be made in the construction and arrangement of the parts of my improved mold, without departing from the essential features and purposes thereof, and it is my intention to cover by my present claims any modified forms of structure or use of mechanical equivalents which may be included within their reasonable scope.

I claim as my invention:

1. In a mold, spaced frame members, means for connecting said frame members together, beveled-faced blocks detachably connected with the respective frame members, and mold wall members detachably mounted on said blocks.

2. In a mold, spaced frame members, pairs of vertically spaced blocks connected with the respective frame members on opposite sides of the mold, wall members mounted on said respective pairs of blocks, the wall members on each side of the mold being successively spaced from each other, leaving spaces, and mold walls having their ends received in said spaces.

3. In a mold, spaced horizontal lower frame members, spaced parallel horizontal upper frame members, blocks mounted on said frame members arranged in horizontal opposite pairs and in vertical opposite pairs, the blocks of the respective frame members being successively, horizontally spaced from each other, horizontally spaced side mold members connecting the respective pairs of vertically spaced blocks, end members for said mold, and mold members detachably mounted between the horizontally spaced side mold members.

4. In a mold, spaced horizontal lower frame members, spaced parallel horizontal upper frame members, blocks mounted on said frame members arranged in horizontal opposite pairs and in vertical opposite pairs, the blocks of the respective frame members being successively, horizontally spaced from each other, side mold members connecting the respective pairs of vertically spaced blocks, end members for said mold, mold members detachably mounted between the horizontally spaced blocks, the adjacent faces of the horizontally spaced pairs of blocks being beveled.

5. In a mold, spaced horizontal lower frame members, spaced parallel horizontal upper frame members, blocks mounted on said frame members arranged in horizontal opposite pairs and in vertical opposite pairs, the blocks of the respective frame members being successively, horizontally spaced from each other, side mold members connecting the respective pairs of vertically spaced blocks, end members for said mold, mold members detachably mounted between the horizontally spaced blocks, the adjacent faces of the horizontally spaced pairs of blocks being beveled, and means for detachably mounting the said wall members and blocks on said frame members.

Des Moines, Iowa, October 27, 1917.

CHARLES J. PERKINS.